United States Patent [19]

Wu

[11] Patent Number: 5,564,669

[45] Date of Patent: Oct. 15, 1996

[54] BASE SUPPORT OF A DISPLAY DEVICE CAPABLE OF MOVING ON A SURFACE

[75] Inventor: Chi-Jung Wu, Taoyuan, Taiwan

[73] Assignee: Acer Peripherals, Inc., Taoyuan, Taiwan

[21] Appl. No.: 383,416

[22] Filed: Feb. 3, 1995

[51] Int. Cl.$^6$ ............................................ A47B 91/00
[52] U.S. Cl. .................... 248/346.01; 248/430; 248/663; 248/656; 248/919
[58] Field of Search ................................. 248/346, 349, 248/346.1, 357, 917, 918, 919, 920, 921, 922, 923, 647, 651, 656, 660, 663, 430, 349.1, 346.01, 346.11

[56] References Cited

U.S. PATENT DOCUMENTS

| | | | |
|---|---|---|---|
| 2,905,229 | 9/1959 | Adams | 248/425 |
| 3,653,340 | 4/1972 | Bugg | 248/425 |
| 4,526,336 | 7/1985 | Durivault et al. | 248/349 |
| 4,591,123 | 5/1986 | Bradshaw et al. | 248/349 |
| 4,635,894 | 1/1987 | Sammons | 248/558 |
| 4,648,574 | 3/1987 | Granlund | 248/349 |
| 4,659,050 | 4/1987 | Tabayoshi | 248/349 |
| 4,687,167 | 8/1987 | Skalka et al. | 248/282 |
| 4,697,778 | 10/1987 | Harashima | 248/349 |
| 4,901,973 | 2/1990 | Ferrara, Jr. | 248/349 |
| 4,919,383 | 4/1990 | Benjamin et al. | 248/349 |
| 4,946,127 | 8/1990 | Kulaga | 248/551 |
| 5,149,043 | 9/1992 | Grundman | 248/349 |

Primary Examiner—Alvin C. Chin-Shue
Assistant Examiner—Brian J. Hamilla
Attorney, Agent, or Firm—Fish & Richardson P.C.

[57] ABSTRACT

The base support of a display device provided comprises a base plate and a brake device. The base plate has a plurality of cavities with a depth and corresponding retainer plates. Within each cavity a rolling ball with a diameter is received. Each retainer plate is attached to the base plate for retaining the rolling ball within the cavity and has a circular opening smaller than the diameter of the rolling ball. The diameter of the rolling ball is larger than the depth of the cavity such that a small portion of the rolling ball is exposed to the outside of the cavity through the circular opening. The rolling ball comes into a first rolling contact with a table surface. The base plate also has a plurality of slots each receiving a roller. The rollers come into a second rolling contact with the table surface. The base plate also has a plurality of slots each receiving a roller. The rollers come into a second rolling contact with the table surface. The brake device is connected to the base plate and is selectively enabled to prohibit the rolling movement of the base support on the table surface.

1 Claim, 4 Drawing Sheets

BASE SUPPORT OF A DISPLAY DEVICE CAPABLE OF MOVING ON A SURFACE

TECHNICAL FIELD OF THE INVENTION

The invention relates in general to a base support of a video display device, e.g. monitor.

BACKGROUND OF THE INVENTION

In the office environment of a modern society, people have to use many data processing equipments to carry out their assignments which includes video display device. With the advent of the larger size monitors, many different types of approach are provided to make the usage of heavier monitors easier and ergonomic.

For instance, the co-pending U.S. patent application Ser. No. 08/147,628, which was filed on Nov. 5, 1993 and will be assigned to the assignee of this application, discloses a direction adjustment and an angle adjustment apparatus for a video display device. The direction adjustment apparatus comprises an upper support and a lower support. The upper support has a bottom which has a plurality of cavities each of which accommodates a roller. The lower support is rotationally connected to the upper support. The lower support has at least a circular guide rail for seating and guiding the roller. The weight of the video display device is transmitted to the circular guide rail of the lower support through the upper support and the roller, and when the upper support is rotated as a result of the direction adjustment of the video display device, the roller is rolling within the circular guide rail of the lower support. The angle adjustment apparatus comprises an upper support, an angle adjustment device and a connecting device. The upper support has a top of a concave shape which has a plurality of cavities each of which accommodates a roller. The angle adjustment device has a bottom of a convex shape which is seated on the roller of the upper support and contacts with the roller in a form of rolling friction. The connecting device connects the angle adjustment device slidably with the upper support. The angle adjustment of the video display device is accomplished by adjusting the relative angular position of the angle adjustment device with respect to the upper support.

However, even with the latest state of arts, the lower (base) support still can not roll on the surface it is seated if the user intends to push the monitor to a desired location.

SUMMARY OF THE INVENTION

It is therefore the first object of the invention to provide a base support which is capable of rolling on the surface it is seated.

The base support of a display device provided comprises a base plate and a brake device. The base plate is able to roll on the surface.

The base plate is adapted to connect with the bottom engagement section of the display device. The base plate has a plurality of cavities with a given depth and corresponding retainer plates. Within each cavity a rolling ball with a given diameter is received. Each retainer plate is attached to the base plate for retaining the rolling ball within the cavity and has a circular opening smaller than the given diameter of the rolling ball. The given diameter of the rolling ball is larger than the given depth of the cavity such that a small portion of the rolling ball is exposed to the outside of the cavity through the circular opening. The rolling ball comes into a first rolling contact with the surface.

The brake device is selectively enabled to prohibit the rolling movement of the base support on the flat surface and is connected to the base plate.

The base support further comprises a plurality of slots, each of which receiving a roller. Each slot has a depth less than a diameter of the roller such that the roller comes into a second rolling contact with the surface.

According to one embodiment, the brake device comprises a rubber plate and a brake-activation device. The rubber plate is connected to the base plate by at least a screw. The brake-activation device has a rod screwed within a female cavity of the base plate and passing through the female cavity. The brake-activation device is selectively pressing the rubber plate coming into high friction contact with the surface.

The utility and advantage of the invention may be further understood with the following description of the invention accompanied by the appended drawings.

DETAILED DESCRIPTION OF THE INVENTION

Figure 1:
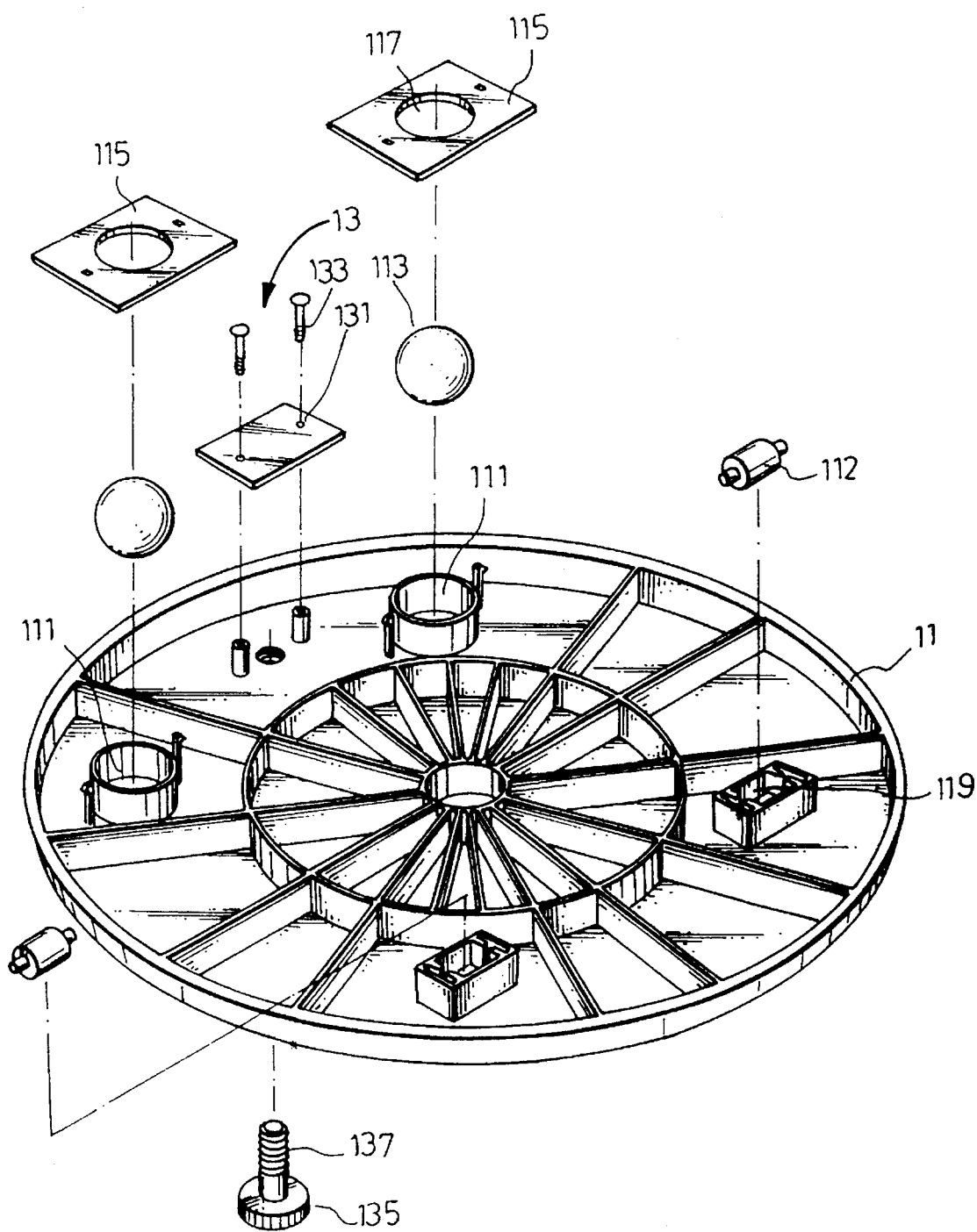
FIG. 1 shows the base support in explosive form.

As shown in FIG. 1, the invention provided comprises a base plate 11 and a brake device 13.

The base plate 11 has a plurality of cavities 111 with a given depth and corresponding retainer plates 115. Within each cavity a rolling ball 113 with a given diameter is received. Each retainer plate 115 is attached to the base plate 11 for retaining the rolling ball 113 within the cavity and has a circular opening 117 smaller than the given diameter of the rolling ball 113. The given diameter of the rolling ball 113 is larger than the given depth of the cavity 111 such that a small portion of the rolling ball 113 is exposed to the outside of the cavity 111 through the circular opening 117. The rolling ball 113 therefore comes into a first rolling contact with the flat surface, e.g. a table, as the base support is seated on the surface.

Figure 4:
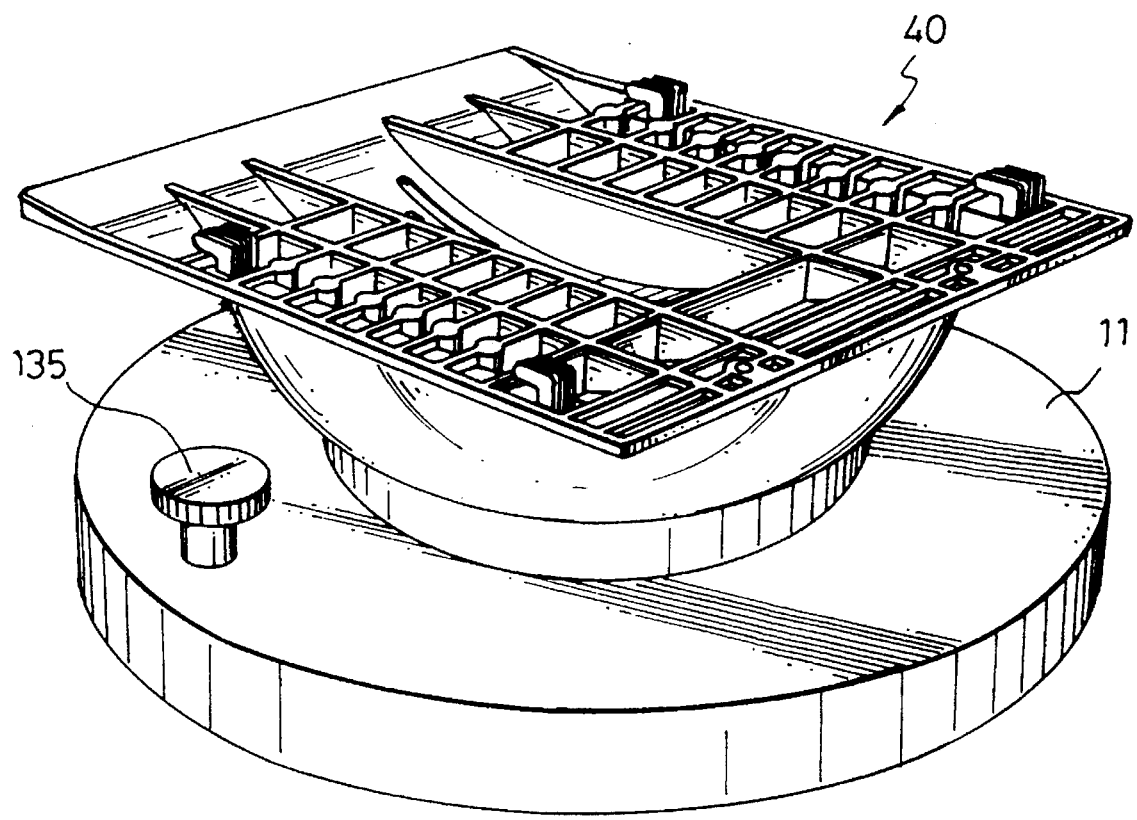
FIG. 4 shows the invention when seated on a surface through the weight of a display device.

The top structure of the base plate 11 is adapted to connect with the engagement section of an angle adjustment apparatus 40 for the display device (not shown), as shown in FIG. 4, and the base plate 11 is capable of rolling on a surface by the rolling ball 113.

Figure 2:
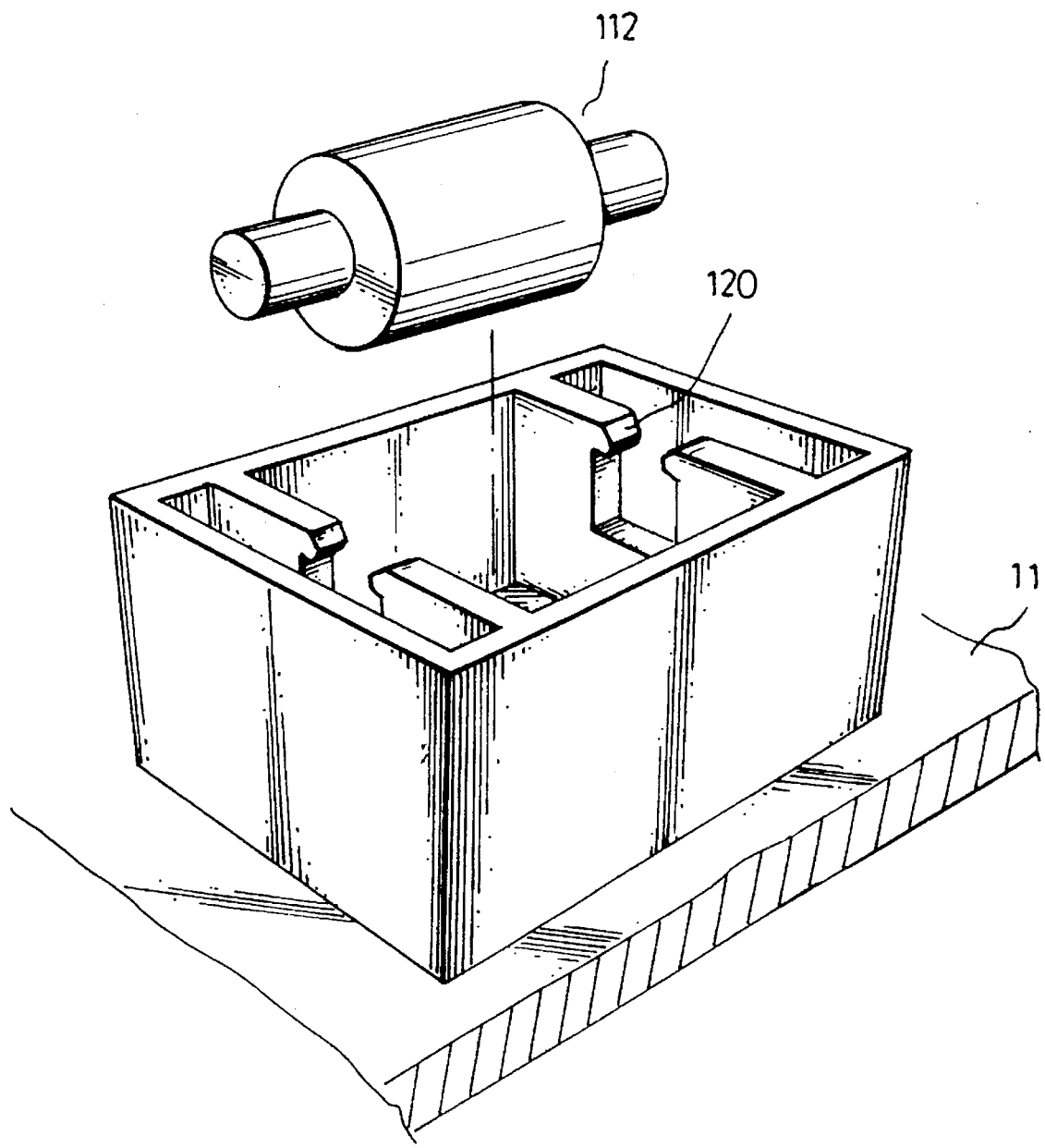
FIG. 2 shows the detailed arrangement of the cavity and the roller in FIG. 1.

As shown in FIG. 2 and 1, the base plate 11 further comprises a plurality of slots 119, each of which receiving a roller 112. A retainer 120 is provided to hold the roller 112 within the slot 119. Each slot 119 has a depth less than a diameter of the roller 112 such that the roller 112 comes into a second rolling contact with the flat surface.

The brake device 13 is connected to the base plate 11, and is selectively enabled to prohibit the rolling movement of the base support on the surface. The brake device 13 comprises a rubber plate 131 connected to the base plate 11 by at least a screw 133 and a brake-activation device 135. The brake-activation device 135 has a rod 137 screwed within a female cavity of the base plate 11. The screw rod 137 passes through the female cavity and is selectively pressing the rubber plate 131 which therefore comes into high friction contact with the surface.

Figure 3:
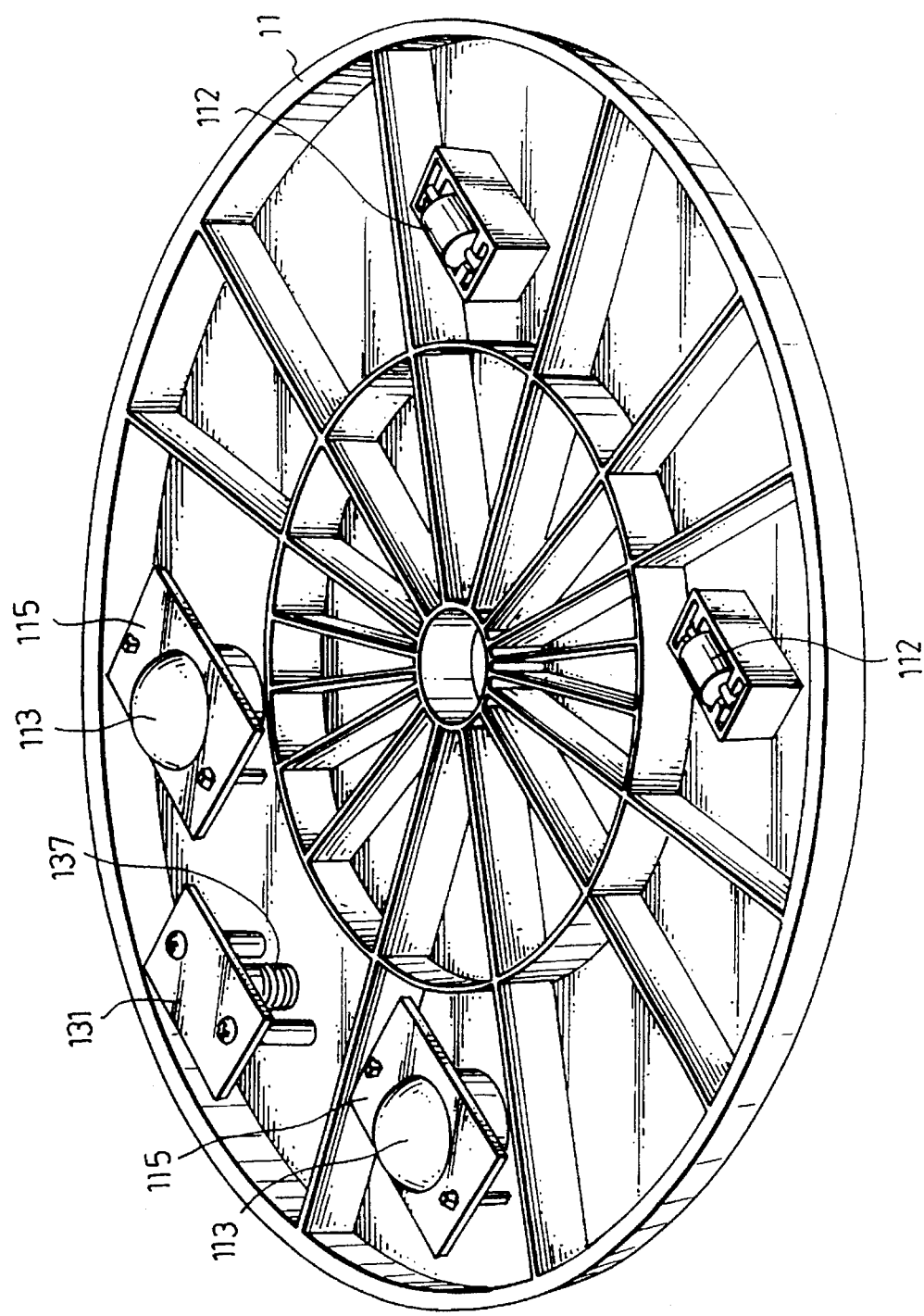
FIG. 3 shows the base support in assembly form.

The invention in assembly form is shown in FIG. 3. The side we see in FIG. 3 is the bottom side of the base support and, it is to noted, when seated on a desk the rolling ball 113 and roller 112 have rolling contact with the surface of the desk.

FIG. 4 shows the status when the invention is in use. The display device (not shown) is connected to and seated on the angle adjustment apparatus 40. The angle adjustment apparatus 40 is movably connected to the base support of the invention at the top side. When used, the user may reach the screw 135 to make the required adjustment to prohibit or allow the sliding of the base support on the seating surface.

What is claimed is:

1. A base support for supporting a display device on a table surface, said base support comprising:

a base plate having a plurality of cavities and a corresponding plurality of retainer plates, each cavity having a given depth and within each cavity a rolling ball of a given diameter is received, each retainer plate being attached to the base plate for retaining the rolling ball within the cavity and having a circular opening smaller than the given diameter of the rolling ball, the given diameter of the rolling ball being larger than the given depth of the cavity such that a small portion of the rolling ball is exposed to the outside of the cavity through the circular opening, so that the rolling ball comes in rolling contact with the table surface during use, said base plate having a plurality of slots each receiving a roller, each slot having a depth less than a diameter of roller such that the roller is in a second rolling contact with the table surface;

a brake connected to the base plate and comprising a rubber plate and a brake-activation mechanism, the rubber plate being connected to the base plate by at least a screw, the brake-activation mechanism having a rod screwed within a female cavity of the base plate and passing through the female cavity, the brake-activation mechanism selectively adjusted to press the rubber plate into high friction contact with the table surface to prohibit the rolling movement of the base support on the table surface.

\* \* \* \* \*